(12) United States Patent
Rucker et al.

(10) Patent No.: US 7,040,254 B1
(45) Date of Patent: May 9, 2006

(54) TRANSPORTABLE ANIMAL WASHING APPARATUS

(76) Inventors: Charlotte D. Rucker, 107 Forest Winds Dr., Salisbury, NC (US) 28144; Jessie L. Sifford, 107 Forest Winds Dr., Salisbury, NC (US) 28144

( * ) Notice: Subject to any disclaimer, the term of this patent is extended or adjusted under 35 U.S.C. 154(b) by 0 days.

(21) Appl. No.: 10/988,050

(22) Filed: Nov. 15, 2004

(51) Int. Cl.
*A01K 29/00* (2006.01)

(52) U.S. Cl. .................................................. 119/675

(58) Field of Classification Search ............... 119/671, 119/673, 675, 676, 678, 600
See application file for complete search history.

(56) References Cited

U.S. PATENT DOCUMENTS

| | | | |
|---|---|---|---|
| 3,749,064 A | * | 7/1973 | Weinstein et al. ........... 119/664 |
| 4,020,796 A | | 5/1977 | Grifa |
| 4,083,328 A | * | 4/1978 | Baker ........................ 119/673 |
| 4,407,234 A | * | 10/1983 | Kleman ..................... 119/672 |
| 4,930,453 A | | 6/1990 | Laliberte |
| 5,243,931 A | | 9/1993 | McDonough |
| 5,279,257 A | | 1/1994 | Temby |
| 5,632,231 A | * | 5/1997 | Moore ........................ 119/671 |
| 5,676,092 A | * | 10/1997 | Ortolivo ..................... 119/650 |
| 5,711,252 A | * | 1/1998 | Brandolino ................. 119/673 |
| D404,853 S | | 1/1999 | Foster et al. |

* cited by examiner

*Primary Examiner*—T. Nguyen

(57) ABSTRACT

A transportable animal washing apparatus includes a base member having a bottom surface and an open top end portion and an integrally disposed outer wall extending upwardly from the bottom surface. The base member is provided with a plurality of drainage holes spaced adjacent the bottom surface and further includes a plurality of drainage plugs removably insertable into the drain holes. The outer wall includes a plurality of apertures formed therein wherein the apertures are situated above the drainage holes. A cover is removably positionable on top of the open top end portion and is provided with an opening formed adjacent a front end portion thereof such that an animal's head can pass outwardly therethrough. The apparatus further includes a protective mechanism for isolating a care giver's hands from water and the animal fur while the care giver is washing the animal.

4 Claims, 4 Drawing Sheets

TRANSPORTABLE ANIMAL WASHING APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a washing apparatus and, more particularly, to a transportable animal washing apparatus.

2. Prior Art

When pets are bathed or washed, soap and water is typically splashed over the surrounding area and the person bathing the pet. Compounding this problem, pets such as dogs or cats have a natural tendency to shake off or spray excess water before they can be dried. In addition, some pets just refuse to remain stationary during any type of grooming activity.

One way pets like dogs can be bathed is in an open shower. Commercial pet grooming salons are known to use this method. In such a situation, the groomer is particularly exposed to the risk of being bitten, scratched, knocked down or otherwise harmed by the pet, in addition to the inconvenience of being soaked by the shower. Therefore, a grooming device is needed which safely and simply restrains the pet during grooming and contains the soap and water associated with bathing the pet.

Various pet grooming devices have been developed in an attempt to solve these problems. With some of the devices, the pet is enclosed in a container having four walls, a bottom and a top and a showering system. A groomer has access to the pet through access holes formed in the walls which are dimensioned to allow passage of the groomer's arm.

One potential problem with pet grooming devices of this type involves the access holes formed in the walls of the container which enable a person to contact the pet while the showering system is in operation. If the access holes in the container walls do not seal, water from the showering system as well as the soap or other cleaning medium being used is likely to splash out of the container through these access holes.

Another feature of many pet grooming devices is a restraint system such as a harness arrangement which is intended to secure and limit the movement of the pet while in the container. A number of these harness arrangements use straps in various configurations which allow the pet varying degrees of freedom to move within the container. However, none of these harnesses permit the pet to move from side-to-side or laterally within the container, i.e., toward and away from the access holes used by the groomer, while still securely restraining the pet from moving forward and backward toward either end of the container (i.e., longitudinally) or up and down within the container (i.e., vertically). Because the access holes are on the sides of the container, a harness arrangement which limits side-to-side movement could hinder efforts to groom the animal. In addition, a harness which allows longitudinal or vertical movement could increase the risk of the groomer being soiled or even harmed by the pet, as well as hinder grooming efforts.

Accordingly, a need remains for a transportable animal washing apparatus that overcomes the above-noted shortcomings. The present invention satisfies such a need by providing a transportable apparatus that can be used to quickly and easily bathe a pet. Such an apparatus would be practical, durable, convenient, and allow a user to thoroughly clean a pet on a regular basis without the need to struggle to hold the pet in place or to deal with other hassles that usually accompany washing a pet.

BRIEF SUMMARY OF THE INVENTION

In view of the foregoing background, it is therefore an object of the present invention to provide a transportable apparatus for washing animals.

These and other objects, features, and advantages of the invention are provided by an apparatus for assisting a care giver to bathe and groom an animal.

The apparatus preferably includes a base member having a centrally disposed longitudinal axis and a substantially planar bottom surface extending therealong. The base member further has an integrally disposed outer wall extending upwardly from the bottom surface along a beveled path and further has an open top end portion sized and shaped for removably receiving the animal therein. The base member may be provided with a plurality of drainage holes spaced adjacent the bottom surface and further includes a plurality of drainage plugs removably insertable into the drain holes. The plugs prevent water from exiting the base member and maintain water at a substantially stable level within the base member. The outer wall preferably further includes a plurality of apertures formed therein and oppositely spaced from the axis wherein the apertures are situated above the drainage holes.

The base member preferably further includes a plurality of flange portions rigidly connected to the base member and adjacent the drain holes for directing water outwardly and away from the base member. The flange portions are disposed along a declining plane offset from a vertical axis.

The present invention preferably includes a cover removably positionable on top of the open top end portion and provided with an opening formed adjacent a front end portion thereof such that an animal's head can pass outwardly therethrough while the animal is positioned inside the base member during operating conditions. The opening is sized and shaped for isolating the animal's head above water level while a body thereof is positioned below water level. The cover preferably has a dome shape and an integral lip portion for engaging a perimeter of the top end portion after being engaged with the base member. The cover opening is offset from a center of the axis and disposed above one of the drain holes.

The apparatus preferably further includes a protective mechanism for isolating a care giver's hands from water and the animal fur while the care giver is washing the animal. The protective mechanism may be positionable through the apertures respectively and may extend inwardly through the outer wall.

The protective mechanism preferably includes a plurality of gloves formed from water impermeable material and having distal and proximal end portions for receiving a care giver's fingers and forearms therein respectively. The gloves preferably include a plurality of textured surface portions for defining scrubbing areas to assist the care giver during operating conditions. The textured surface portions may be selectively positioned along a care giver's appendages and palms and have substantially disc-like shapes respectively.

The apertures are equidistantly spaced from the axis for allowing more than one caregiver to position their hands into the apertures respectively such that a plurality of caregivers can simultaneously wash the animal. Such apertures are oppositely spaced from each other so care givers simultaneously washing an animal face each other and are able to communicate easily during operating conditions. A first pair of apertures are preferably situated above the bottom surface and disposed along a horizontal plane subjacent the top end portion such that the care giver can adequately reach upwardly into the base member.

The present invention preferably further includes a plurality of mounting brackets secured to the base member and a plurality of wheels operably connected to the mounting brackets such that the apparatus can be rolled along a support surface. A plurality of locking levers may be adjustably connected to the wheels for allowing a user to maintain the wheels at a fixed and stationary position during operating conditions.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
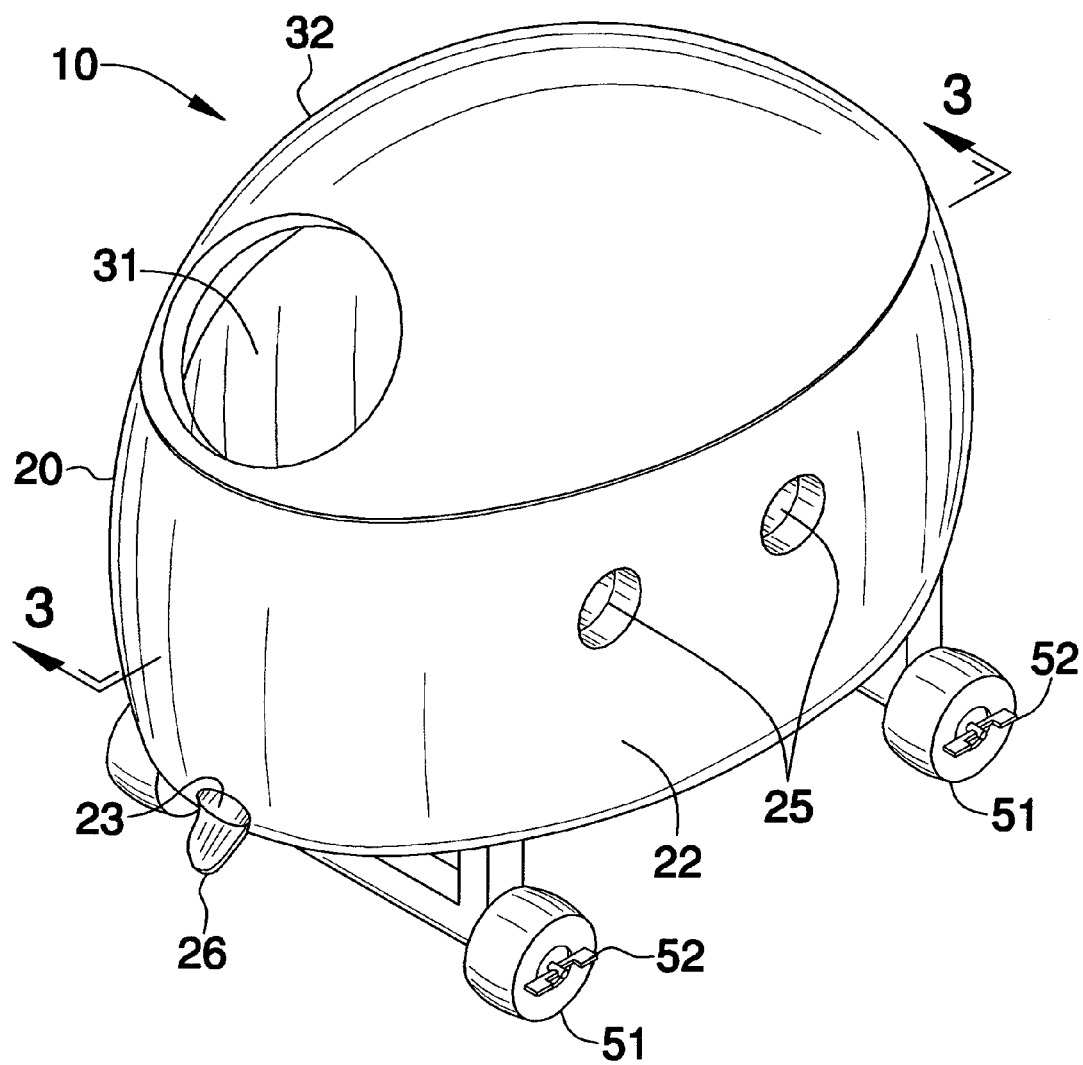
FIG. 1 is a perspective view showing a transportable animal washing apparatus, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–5 by the reference numeral 10 and is intended to provide a transportable animal washing apparatus. It should be understood that the apparatus 10 may be used to wash many types of small animals and should not be limited to washing only dogs and cats.

Figure 2:
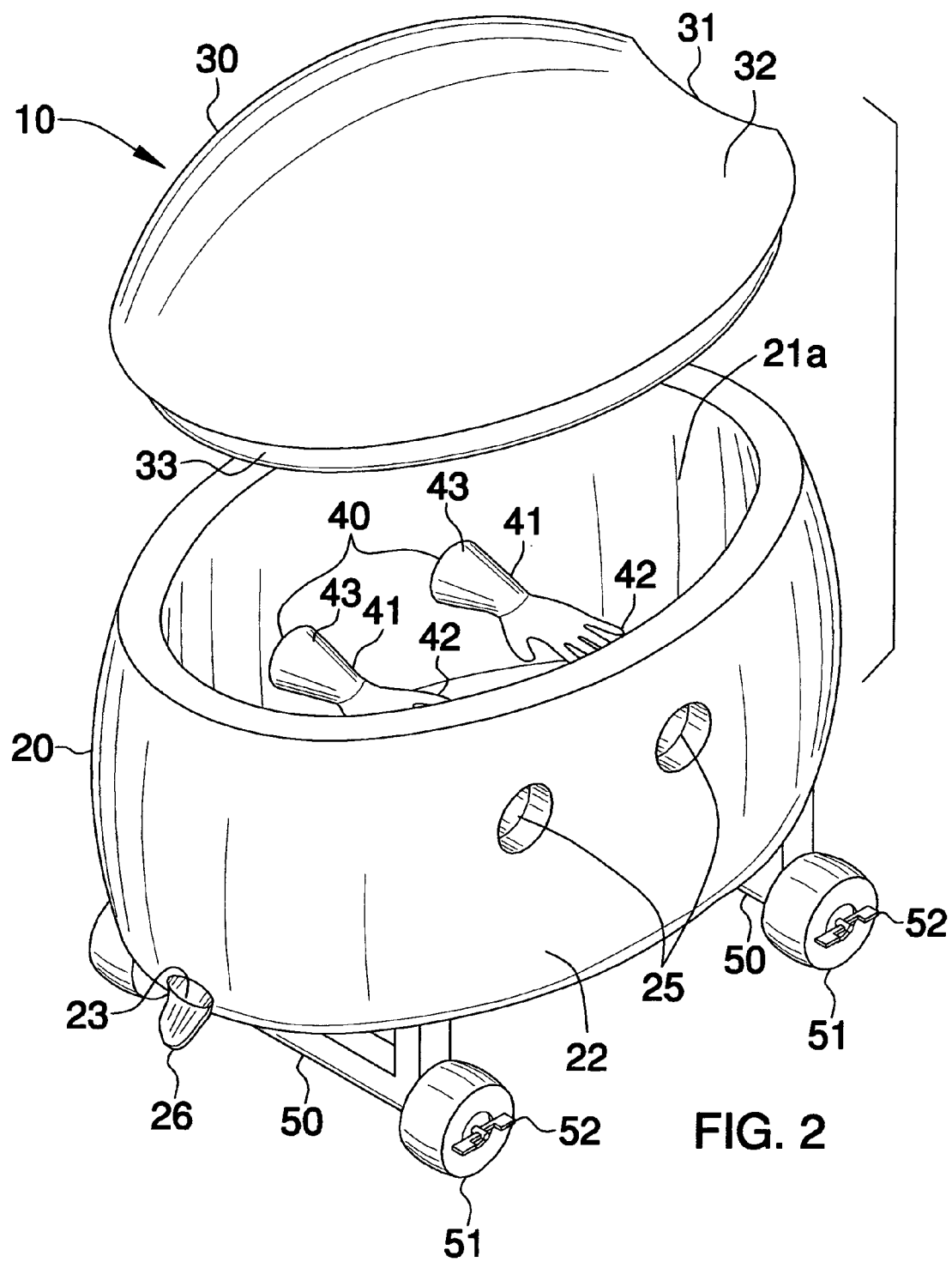
FIG. 2 is a perspective view of the present invention shown in FIG. 1, showing the removable cover and a pair of gloves positioned in the apertures.
Figure 3:
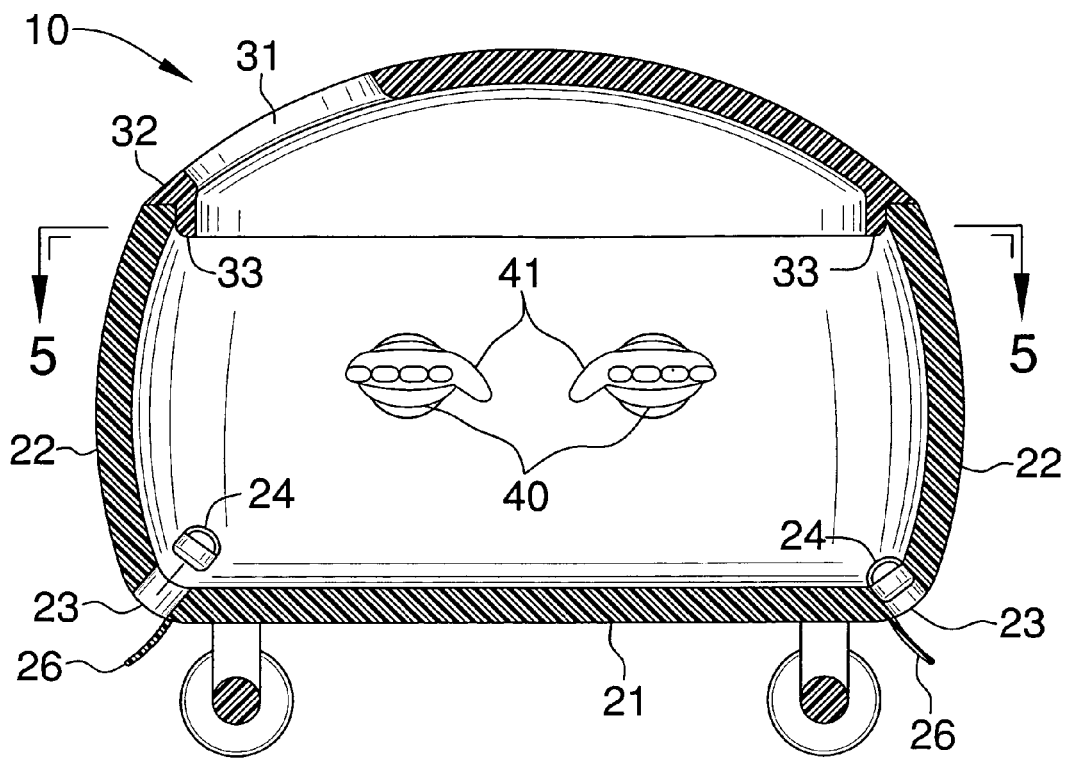
FIG. 3 is a cross-sectional view of the present invention shown in FIG. 1 illustrating the insertion of the drain plugs into the drain holes and a pair of gloves positioned in the apertures, taken along line 3—3.

Initially referring to FIGS. 1 and 2, the apparatus 10 preferably includes a base member 20 having a centrally disposed longitudinal axis (not shown) and a substantially planar bottom surface 21 extending therealong, as shown in FIG. 3. The base member 20 has an integrally disposed outer wall 22 extending upwardly from the bottom surface 21 along a beveled path and further has an open top end portion 21A sized and shaped for removably receiving the animal therein. The base member 20 is preferably formed from durable plastic material because of its light weight and strength, but may, of course, be formed from other materials such as aluminum, as well known in the industry.

The base member 20 may be provided with a plurality of drainage holes 23 spaced adjacent the bottom surface 21 and further includes a plurality of drainage plugs 24 removably insertable into the drain holes 23, as shown in FIG. 3. The plugs 24 prevent water from exiting the base member 20 and maintain water at a substantially stable level within the base member 20. The outer wall 22 preferably further includes a plurality of apertures 25 formed therein and oppositely spaced from the axis wherein the apertures 25 are situated above the drainage holes 23. The base member 20 preferably further includes a plurality of flange portions 26 rigidly connected to the base member 20 and adjacent the drain holes 23 for directing water outwardly and away from the base member 20. The flange portions 26 are disposed along a declining plane offset from a vertical axis. Such flange portions 26 assist a user in directing water to a drain or other drainage area so it can be readily disposed of without contaminating the environment.

Still referring to FIGS. 1 and 2, the apparatus 10 preferably includes a cover 30 removably positionable on top of the open top end portion 21A and provided with an opening 31 formed adjacent a front end portion 32 thereof such that an animal's head can pass outwardly therethrough while the animal is positioned inside the base member 20 during operating conditions. The opening 31 is sized and shaped for isolating the animal's head above water level while a body thereof is positioned below water level. The cover 30 preferably has a dome shape and an integral lip portion 33 for engaging a perimeter of the top end portion 21A after being engaged with the base member 20.

Such a lip portion 31 ensures that the cover 30 is securely positioned on top of the base member 20, thus maintaining the animal at a substantially stable position during operating conditions. The cover opening 31 is offset from a center of the axis and disposed above one of the drain holes 23. Such a cover opening 31 enables a pet to keep its head above the water level and further provides the pet with the ability to see its surroundings, allaying any fears it may have of being contained in the apparatus 10 and providing assurance to the pet that it is safe and in a familiar environment with people it knows and loves.

Figure 4:
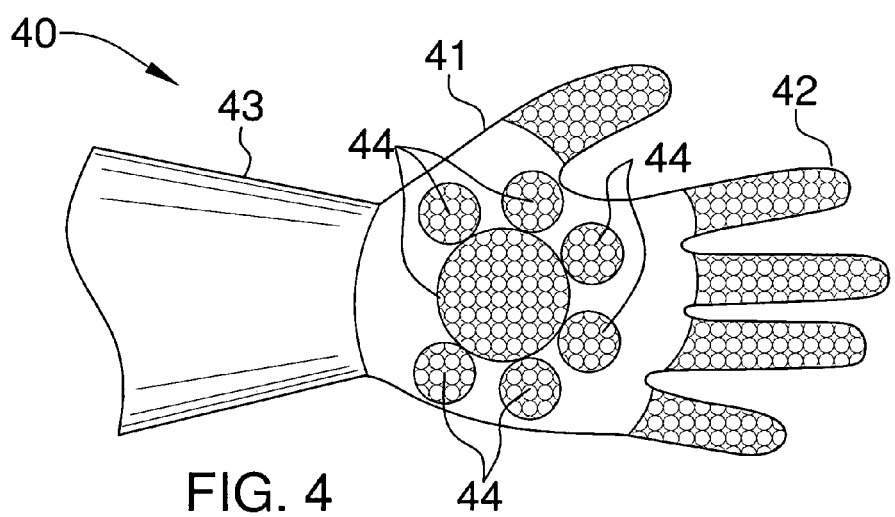
FIG. 4 is a bottom view of a glove showing the textured surface portion.
Figure 5:
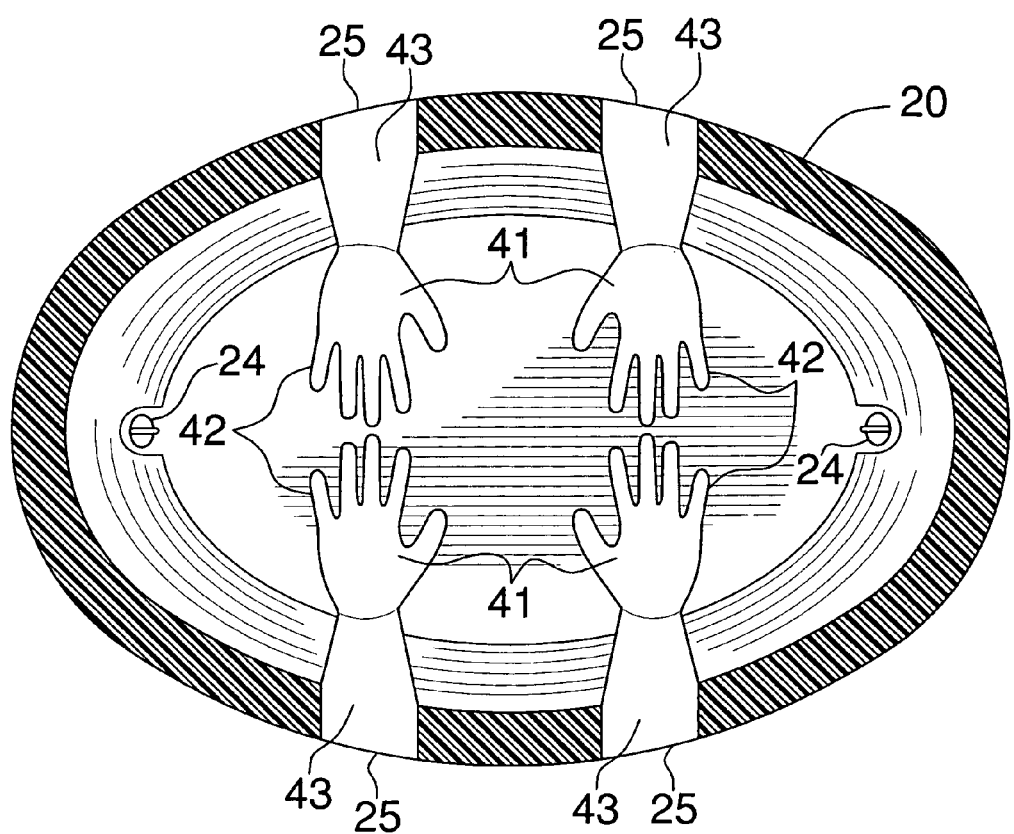
FIG. 5 is a cross-sectional view of the present invention illustrating a plurality of gloves simultaneously positioning in the apertures, taken along line 5—5.

Referring to FIGS. 3, 4 and 5, the apparatus 10 preferably further includes a protective mechanism 40 for isolating a care giver's hands from water and the animal fur while the care giver is washing the animal. The protective mechanism 40 may be positionable through the apertures 25 respectively and may extend inwardly through the outer wall 22, as shown in FIGS. 3 and 5.

Still referring to FIGS. 3, 4 and 5, the protective mechanism 40 preferably includes a plurality of gloves 41 formed from water impermeable material and having distal 42 and proximal 43 end portions for receiving a care giver's fingers and forearms therein respectively. The gloves 41 preferably include a plurality of textured surface portions 44 for defining scrubbing areas to assist the care giver during operating conditions. The textured surface portions 44 may be selectively positioned along a care giver's appendages and palms and have substantially disc-like shapes respectively. Such scrubbing discs aid a user in removing dirt and other contaminants from a pet's fur without hurting the animal. The gloves 41 ensure that a user retains the touch and feel necessary to do a thorough cleansing while comforting the pet at the same time.

Referring to FIG. 5, the apertures 25 are equidistantly spaced from the axis for allowing more than one care giver to position their hands into the apertures 25 respectively such that a plurality of caregivers can simultaneously wash the animal. This feature allows a second care giver to lend a second pair of hands to help hold and wash the pet, thus decreasing the amount of time and energy required to complete the bathing. The less time the animal is contained, the less nervous, and thus, more cooperative, they are apt to be.

Such apertures 25 are oppositely spaced from each other, allowing the care givers to face each other and communicate more readily during operating conditions. A first pair of apertures 25 are preferably situated above the bottom surface 21 and disposed along a horizontal plane subjacent the top end portion 21A such that the care giver can adequately reach upwardly into the base member 20.

Referring to FIGS. 1, 2 and 3, the apparatus 10 preferably further includes a plurality of mounting brackets 50 secured to the base member 20 and a plurality of wheels 51 operably connected to the mounting brackets 50 such that the apparatus 10 can be rolled along a support surface. A plurality of locking levers 52 may be adjustably connected to the wheels 51 for allowing a user to maintain the wheels 51 at a fixed and stationary position during operating conditions. This feature conveniently allows the apparatus 10 to be transported between remote locations, yet provides the stability necessary to do a thorough cleaning job while calming the animal.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for assisting a care giver to bathe and groom an animal, said apparatus comprising:

a base member having a centrally disposed longitudinal axis and a substantially planar bottom surface extending therealong, said base member further having an integrally disposed outer wall extending upwardly from the bottom surface along a beveled path, said base member further having an open top end portion sized and shaped for removably receiving the animal therein, said base member being providing with a plurality of drainage holes spaced adjacent said bottom surface and further including a plurality of drainage plugs removably insertable into the drain holes, said plugs for preventing water from exiting said base member and for maintaining water at a substantially stable level within said base member, said outer wall further including a plurality of apertures formed therein and oppositely spaced from the axis wherein the apertures are situated above the drainage holes, said base member further including a plurality of flange portions rigidly connected to said base member, said plurality of flange portions having upper and lower portions having a generally concave shape, said upper portion being monolithically formed with said drain hole, said lower portion diverging downwardly and away from said drain hole, said flange portions terminating at a position generally medially between said bottom surface and a ground surface, said flange portions being disposed along an declining plane offset from a vertical axis;

a cover removably positionable on top of said open top end portion, said cover being provided with an opening formed adjacent a front end portion thereof such that an animal's head can pass outwardly therethrough while the animal is positioned inside said base member during operating conditions, said opening being rigid and non-deformable, said opening being sized and shaped for isolating the animal's head above water level while a body thereof is positioned below water level, said cover having a dome shape and a monolithically formed lip portion extending downwardly and about an interior surface of the base member, said lip portion being non-pivotal, the cover opening being offset from a center of the axis and disposed above one said drain holes; and protective means for isolating a care giver's hands from water and the animal fur while the care giver is washing the animal, said protective means being positionable through the apertures respectively and extending inwardly through said outer wall, said protective means comprises a first and second pair of gloves formed from water impermeable material and having distal and proximal end portions for receiving a care giver's fingers and forearms therein respectively, said distal end portions having a plurality of extensible finger portions, said first and second pair of gloves being positionable in the apertures, said first and second pair of gloves traversing the longitudinal axis when positioned in the apertures, said gloves comprise a plurality of textured surface portions for defining scrubbing areas to assist the care giver during operating conditions, said textured surface portions being selectively positioned along a care giver's appendages and palms and having substantially disc-like shapes respectively said textured surface portions including a central disc having a plurality of annular discs radially extending and directly connected to said central disc, said plurality of annular discs having a diameter less than said central disc.

2. The apparatus of claim 1, wherein the apertures are equidistantly spaced from the axis for allowing more than one caregiver to position their hands into the apertures respectively such that a plurality of caregivers can simultaneously wash the animal.

3. The apparatus of claim 1, further comprising:
a plurality of mounting brackets secured to said base member, said mounting brackets each having an elongated and rectilinear shaft and a plurality of end portions monolithically formed therewith and extending orthogonally therefrom, said end portions each including a top portion directly connected to said base member;
a plurality of wheels operably connected to said mounting brackets such that said apparatus can be rolled along a support surface; and
a plurality of locking levers adjustably connected to said wheels for allowing a user to maintain said wheels at a fixed and stationary position during operating conditions.

4. The apparatus of claim 1, wherein a first pair of the apertures are situated above said bottom surface and disposed along a horizontal plane subjacent said top end portion such that the care giver can adequately reach upwardly into said base member.

* * * * *